(12) United States Patent
McGuirk et al.

(10) Patent No.: US 9,126,105 B2
(45) Date of Patent: Sep. 8, 2015

(54) EXPANDING THE GAMING SOCIAL NETWORK WITH UNRELATED PLAYERS

(71) Applicants: Jason McGuirk, San Mateo, CA (US);
Miguel Sanchez, New York, NY (US);
Kyle Saugier, Burlingame, CA (US)

(72) Inventors: Jason McGuirk, San Mateo, CA (US);
Miguel Sanchez, New York, NY (US);
Kyle Saugier, Burlingame, CA (US)

(73) Assignee: Zynga Inc., San Francisco, CA (US)

( * ) Notice: Subject to any disclaimer, the term of this patent is extended or adjusted under 35 U.S.C. 154(b) by 53 days.

(21) Appl. No.: 13/746,825

(22) Filed: Jan. 22, 2013

(65) Prior Publication Data

US 2013/0130805 A1    May 23, 2013

Related U.S. Application Data

(63) Continuation of application No. 13/244,708, filed on Sep. 26, 2011, now Pat. No. 8,388,450.

(51) Int. Cl.
*A63F 9/24*  (2006.01)
*A63F 13/40* (2014.01)
*A63F 13/30* (2014.01)

(52) U.S. Cl.
CPC . *A63F 9/24* (2013.01); *A63F 13/10* (2013.01); *A63F 13/12* (2013.01); *A63F 2300/407* (2013.01); *A63F 2300/556* (2013.01)

(58) Field of Classification Search
CPC .................................................... A63F 13/12
USPC .................................................... 463/39–42
See application file for complete search history.

(56) References Cited

U.S. PATENT DOCUMENTS

2006/0136584 A1* 6/2006 Decker et al. ................. 709/224
2007/0271328 A1* 11/2007 Geelen et al. ................. 709/201

* cited by examiner

*Primary Examiner* — Omkar Deodhar
(74) *Attorney, Agent, or Firm* — Martine Penilla Group, LLP

(57) ABSTRACT

Methods, systems, and computer programs are presented for expanding gaming social networks with players having no existing social relationships with other players. One method includes an operation for identifying first filters selected by a first user, the first filters identifying a first criteria for desired new friends. Another operation identifies second filters selected by a plurality of users in the network, where the second filters are entered by each user to identify second criteria for being added as a friend in the network. A plurality of candidates to be added as friends for the first user are determined, where each candidate conforms to the first criteria and where the first user conforms to the second criteria set by each candidate. Additionally, friendship requests are sent to one or more of the candidates or candidates are added as friends when the candidates have chosen automatic addition of friends.

17 Claims, 12 Drawing Sheets

EXPANDING THE GAMING SOCIAL NETWORK WITH UNRELATED PLAYERS

CLAIM OF PRIORITY

This application is a Continuation application under 35 USC §120 and claims priority from U.S. application Ser. No. 13/244,708, entitled "EXPANDING THE GAMING SOCIAL NETWORK WITH UNRELATED PLAYERS", and filed on Sep. 26, 2011, and is herein incorporated by reference.

BACKGROUND

1. Field of the Invention

The present invention relates to methods for playing online social games, and more particularly, methods, systems, and computer programs for expanding gaming social networks with players that do not have an existing social relationship with other players.

2. Description of the Related Art

Online games that allow players to interact with other players have become popular. Some online games, such as chess or bridge, have a small number of players that play together at the same time. Other online games, such as Massively Multiplayer Online (MMO) games, can have a large number of players playing simultaneously. Online game operators, also referred to as social game operators, harness the power of online social networks, to design games that closely integrate the players' social graph data with their existing friendship connections.

In social MMO games, players collaborate in order to play the game and make progress. In some games, the more the players collaborate in the game, the faster that progress is made in the online the game. However, some players have few friends, and some of the friends may not be playing the same game. For example, a player may need four neighbors to form a crew to complete a mission in the game, but only one friend is available for the crew, making it hard for the player to complete the game mission without a crew. Thus, many players get frustrated with the game, because they cannot get the help from other players to progress in the game. This may cause some players to abandon the game and search for other games, where progress is easier without the need of friends.

It is in this context that embodiments arise.

SUMMARY

Methods, systems, and computer programs are presented for expanding gaming social networks with players that do not have an existing social relationship with other players. In one embodiment, a method includes an operation for determining one or more selection rules for a player of an online game, where each selection rule defines a criterion for selecting users from a plurality of users. The determined one or more selection rules are applied to the plurality of users resulting in a plurality of candidate game friends from the plurality of users. At least one of the candidate game friends does not have a social link with the player. In addition, the method includes an operation for presenting the plurality of candidate game friends. An operation to link, in the online game, the player with at least one of the plurality of candidate game friends is initiated in response to an input from the player.

In another embodiment, a system for processing game operations during execution an online game includes a filtering server, which is operable to determine one or more selection rules for a player of an online game. Each selection rule defines a criterion for selecting users from a plurality of users. The filtering server is further operable to apply the determined one or more selection rules to the plurality of users, resulting in a plurality of candidate game friends from the plurality of users. At least one candidate game friend does not have a social link with the player, and a game server is operable to receive the plurality of candidate game friends from the filtering server and present the plurality of candidate game friends. The game server is further operable to initiate an operation to link, in the online game, the player with at least one of the plurality of candidate game friends in response to an input from the player.

In yet another embodiment, a method, for processing game operations during execution an online game, includes an operation for presenting one or more possible rules to a player of an online game, each possible rule defining a criterion for selecting users from a plurality of users. One or more selection rules and associated parameter values are determined in response to an input from the player. The method includes another operation for applying the determined one or more selection rules to the plurality of users, resulting in a plurality of candidate game friends from the plurality of users, where at least one candidate game friend does not have a social link with the player. The candidate game friends are sorted according to a score for each of the candidate game friends, the score being obtained by applying the one or more selection rules to each of the candidate game friends. In addition, an operation to link, in the online game, the player with at least one of the plurality of candidate game friends, is then initiated, where at least one operation of the method is executed through a processor.

In another embodiment, a method includes an operation for identifying first filters selected by a first user, the first filters identifying a first criteria for desired new friends. Another operation identifies second filters selected by a plurality of users in the network, where the second filters are entered by each user to identify second criteria for being added as a friend in the network. A plurality of candidates to be added as friends for the first user are determined, where each candidate conforms to the first criteria and where the first user conforms to the second criteria set by each candidate. Additionally, friendship requests are sent to one or more of the candidates or candidates are added as friends when the candidates have chosen automatic addition of friends.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process operations and structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

BRIEF DESCRIPTION OF THE DRAWINGS

The invention may best be understood by reference to the following description taken in conjunction with the accompanying drawings.

DETAILED DESCRIPTION

Methods, systems, and computer programs for expanding gaming social networks with players that do not have an existing social relationship with other players are presented. Embodiments of the invention allow a player to add new friends or neighbors in the online game, where the new friends are outside the social network of the player (e.g., Facebook® friends). It will be apparent, that the present embodiments may be practiced without some or all of these specific details. In other instances, well known process operations have not been described in detail in order not to unnecessarily obscure the present embodiments.

Figure 1:
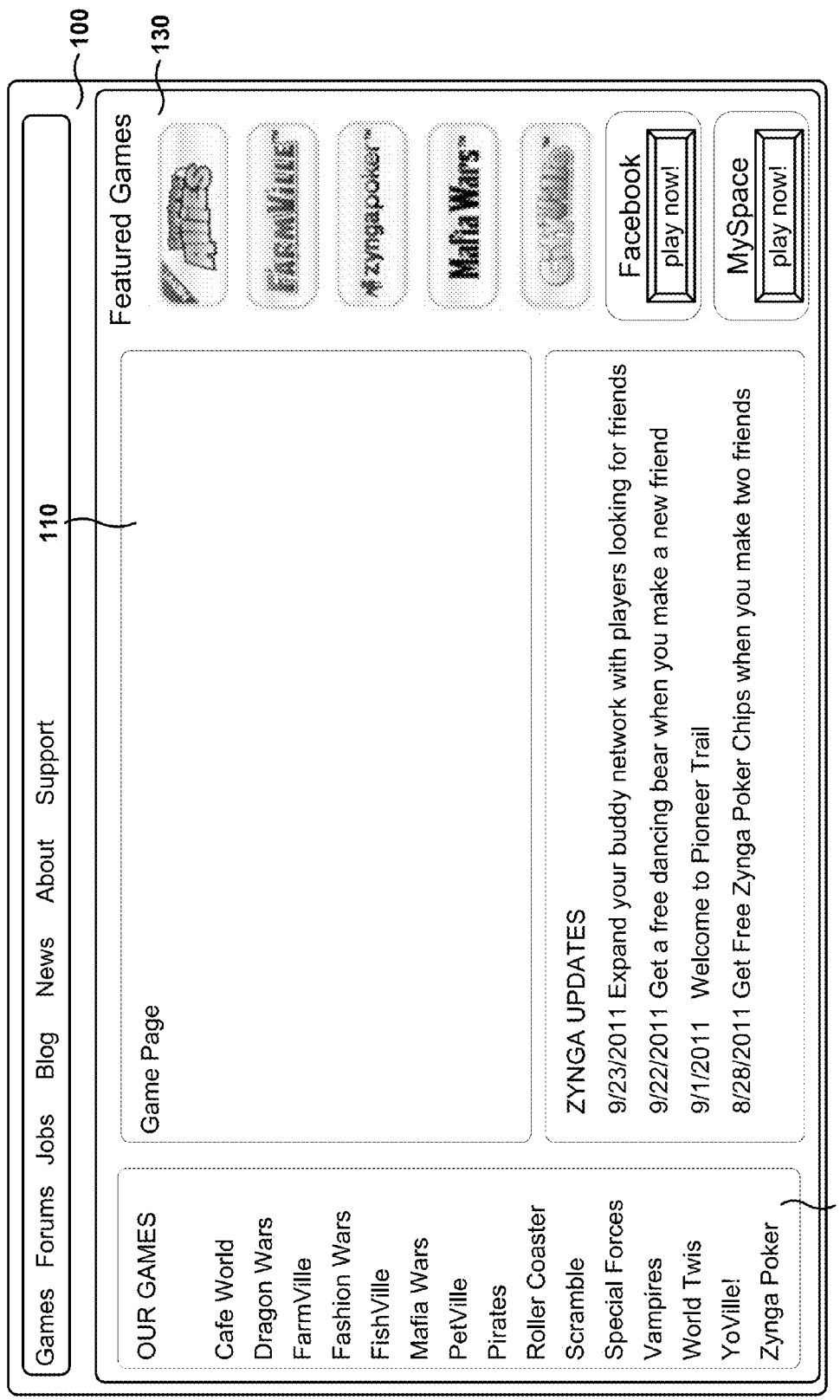
FIG. 1 illustrates an embodiment of a web page for playing an online game.

FIG. 1 illustrates an embodiment of a web page 100 for playing an online game. A web page is a structured document or resource of information that is suitable for a computer network, such as the World Wide Web, the Internet, or an Intranet. A web page is identified by a unique Uniform Resource Locator (URL) and may be accessed through a web browser and displayed on the screen of a network device. Some web pages are dynamic and are constructed at the time the web page is requested by a network user. As a result, the actual content included in dynamic web pages may vary over time. In addition, web pages may include multimedia content (e.g., image, video, or audio), or embedded references thereto, as well as text content.

Web page 100 is one embodiment of a page designed for playing games online via web browsers. In this embodiment, a list of games 120 is presented for selection by the player, and a list of featured games 130 identifies popular games. In one embodiment, the game is played in game area 110 as an embedded component that may use any technology for presenting multimedia dynamic content, such as Hyper Text Markup Language 5 (HTML5), Adobe Flash®, etc.

Adobe Flash (formerly known as Macromedia Flash) is a multimedia platform for adding animation and interactivity to web pages. A Flash component (e.g., game area 110) may be embedded in a web page (e.g., web page 100) to create animation, advertisements, or games and to integrate video into the web page. Adobe Flash can manipulate vector and raster graphics and support bidirectional streaming of audio and video. In one embodiment, Adobe Flash libraries are used with the Extensible Markup Language (XML) capabilities of the web browsers to render rich content in the browsers. This technology is known as Asynchronous Flash and XML.

Another technology for displaying dynamic content in a web page is HTML5. HTML5's features include media playback and offline storage. With a predecessor version to HTML5, named HTML4, sites have to reach for Adobe Flash (or Silverlight) to show a video or play music. However, HTML5 lets sites directly embed media using Hyper Text Markup Language (HTML) tags (e.g., "<video>" and "<audio>"), and plugins are not required.

In one embodiment, games include objects, such as characters, currencies, tools, assets, social relations, etc. For example, in a war game, the characters may be the soldiers fighting on respective sides of the war. In addition, there may be weapons used by the soldiers and objects around the battlefield (e.g., buildings, trees, animals, mountains, rivers, and so on). Each game object may be defined according to a predetermined syntax. For example, the definition of a game object may include shape, texture, physical capabilities, connection or relationship with other game objects, etc.

In another embodiment, a game application is embedded in a web page (e.g., web page 100) and the players play the game via web browsers. The display of a game is sometimes referred to as the "stage" of the game. Thus, the stage of the game may be implemented as Adobe Flash or HTML5 component embedded in the web page. For example, the stage is essentially a data structure that defines some of the basic elements of the game, such as aspect ratio and display size. At any given time, a game scene may be rendered and displayed on the stage by attaching one or more game objects to the stage.

Figure 2:
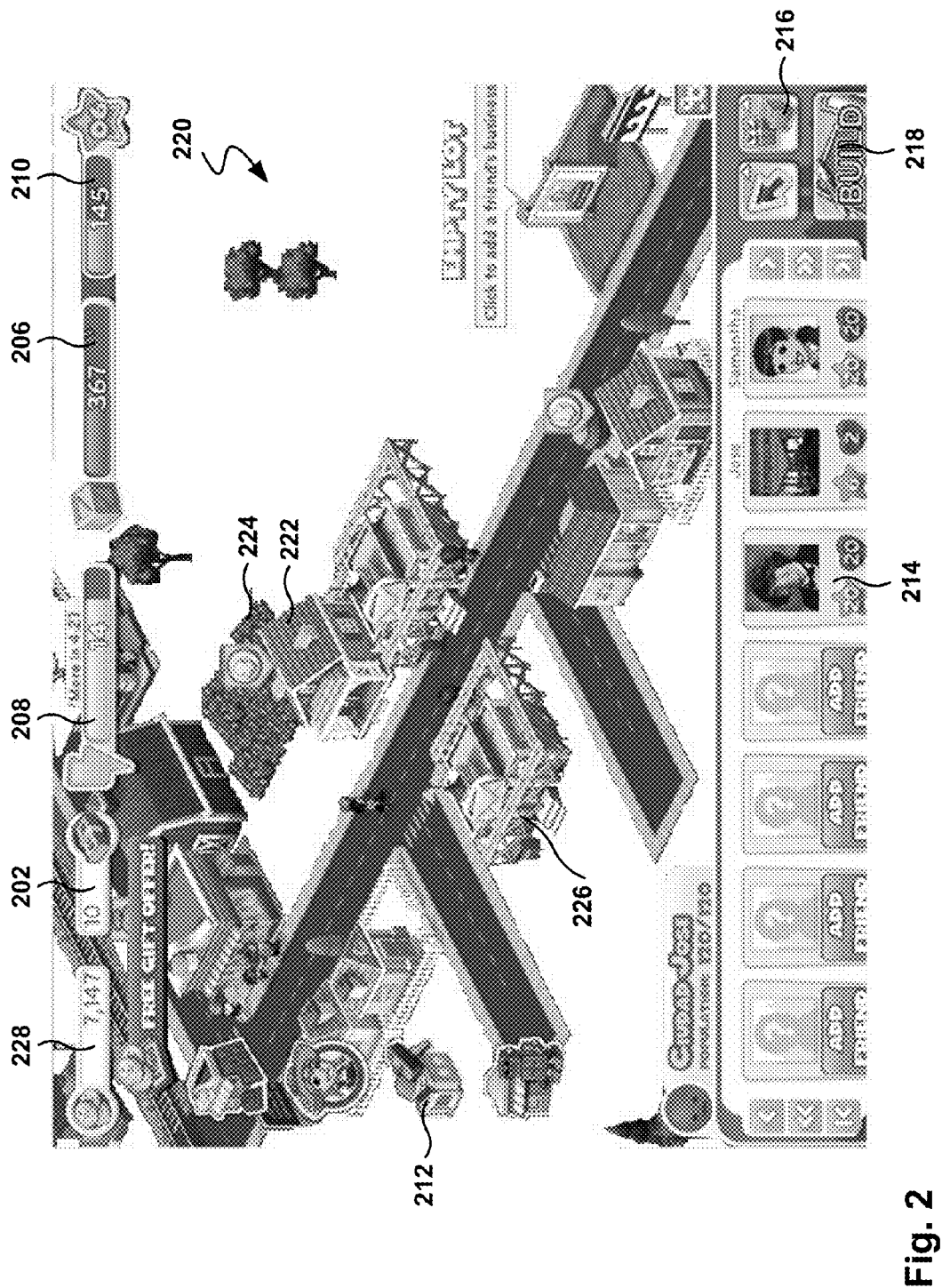
FIG. 2 shows the stage of an online game, according to one embodiment.

FIG. 2 shows the stage of an online game, according to one embodiment. The online game of FIG. 2 can be played in game area 110 of FIG. 1, but the online game can also be played in other environments. In one embodiment, the game includes a three-dimensional view 220 of a city that evolves as the player makes progress in the game. As the player advances in the game, the player acquires assets, which can take multiple forms. In one embodiment, assets include first virtual currency asset 202, second virtual currency 228, goods 206, energy asset 208, sheep building 222, crop asset 224, community building asset 226, badges, badge collections, temporally tiered levels, bonuses, promotions, penalties, digital content (e.g., image files, icons, audio files, video files), gifts, tokens, honor title, rewards, invitation permissions, avatars, rally points, diaries, footprints, trophies, competitions, engagement modes, user difficulty modes (e.g., novice, intermediate, expert), stars, medals, gems, pets, exploration quests, etc. Each asset can be used for one or more purposes. For example, first virtual currency 202 can be used during the game to make progress, also referred to herein as advancement. The first virtual currency 202 can be used to acquire assets (e.g., buildings or decorations), to remove an obstacle in the game (e.g., enabling progress that would otherwise be blocked), or to complete a task (e.g., finish decorating a house).

In particular embodiments, the first and the second virtual currencies are used for different purposes, although some assets may be bought with either of the currencies. The first virtual currency has higher purchasing value than the second virtual currency. For example the first virtual currency can unblock some obstacles in the game that the second virtual currency cannot. Although a small amount of first virtual currency may be given to the player as the game starts, a player needs to purchase more first virtual currency with real currency, also referred to herein as legal currency, real-world currency, or real cash. This provides a revenue stream for the online game provider.

In one embodiment, the online game includes missions 212, which identify one or more tasks that the player must complete before the mission is considered satisfied or finished. For example, a mission may require three tasks: chopping down a tree, feeding an animal, and planting an apple tree. Upon completion of the mission, the player is rewarded in some fashion, such as providing a new asset, increasing the amount of energy, getting more virtual currency, etc. As the player completes tasks and missions, the game score 210 is increased, and as the game score increases the experience level may also increase.

Clicking on inventory icon 216 causes the online game to display a list of all the items or assets owned by the player. In addition, clicking on build icon 218 takes the player to a virtual marketplace where assets (e.g., buildings) can be acquired. As described above, assets can be from within different categories such as buildings, decorations, housing, businesses, crops, trees, animals, energy, special items, weapons, etc. Each category includes a plurality of assets within the category. For example, the housing category includes a cottage, a town house, a family house, a suburban house, a country house, an apartment building, a ranch, etc. Some of the items within a category can be freely acquired by the player, while purchasing of some items can be blocked until certain game condition is met, such as reaching some score, finishing a mission, purchasing the ability to unblock the blocked item, etc.

In one embodiment, the online game is an online social game, which leverages social relationships between the player and other online game players socially linked to the player. For example, the player may add a neighbor 214 to the game by inviting a friend from a social networking site. A neighbor of a first player, as referred to herein, is a second player that has established a social relationship (i.e., a social link) in the online game with the first player. The social relationship is typically established by having one player inviting the other player to become a neighbor, and then the other player accepting the invitation. Once the invitation is accepted, both players are "neighbors." A neighbor may also be referred to as a friend, a crew member, a "buddy," a partner, an ally, etc.

There are many types of online social networks run and maintained by various companies, and any one of these companies can provide access to social graph data. Some examples of companies, without limitation to others, may include Facebook, Google+®, Yahoo!® Groups, Linkedin®, etc. Once a friend accepts being a neighbor, a social relationship is established in the game where the game played by the player and the game played by the neighbor can interact with each other. For example, the player may visit the game board (e.g., city) of the neighbor and perform some game activities therein, and will be rewarded for doing so. Some of the missions in the game may include social activities that promote the interaction between players. For example, one mission may include planting tomatoes in the neighbor's farm. Therefore, the social interaction can provide advancement for the player and for the neighbor.

In one embodiment, a game board is created the first time the player plays the online game. The game board can be a city, a farm, a forest, an island, etc., and the game board may also be referred to as the player's world, environment, playground, etc. As the player makes progress in the game, the game board changes by adding assets (e.g., adding buildings, shops, clearing trees, land, etc.), or by removing obstacles (e.g., cutting down a tree). Each player manages her own game board, although other players linked to the player (e.g., neighbors) in the online game may help by visiting and performing activities in the neighbor's game board. In one embodiment, only the players socially linked to the owner of the game board can visit to perform game activities therein.

It is noted that the embodiments illustrated in FIG. 2 are exemplary. Other embodiments may utilize different assets, missions, social interactions, etc. The embodiments illustrated in FIG. 2 should therefore not be interpreted to be exclusive or limiting, but rather exemplary or illustrative.

Figure 3:
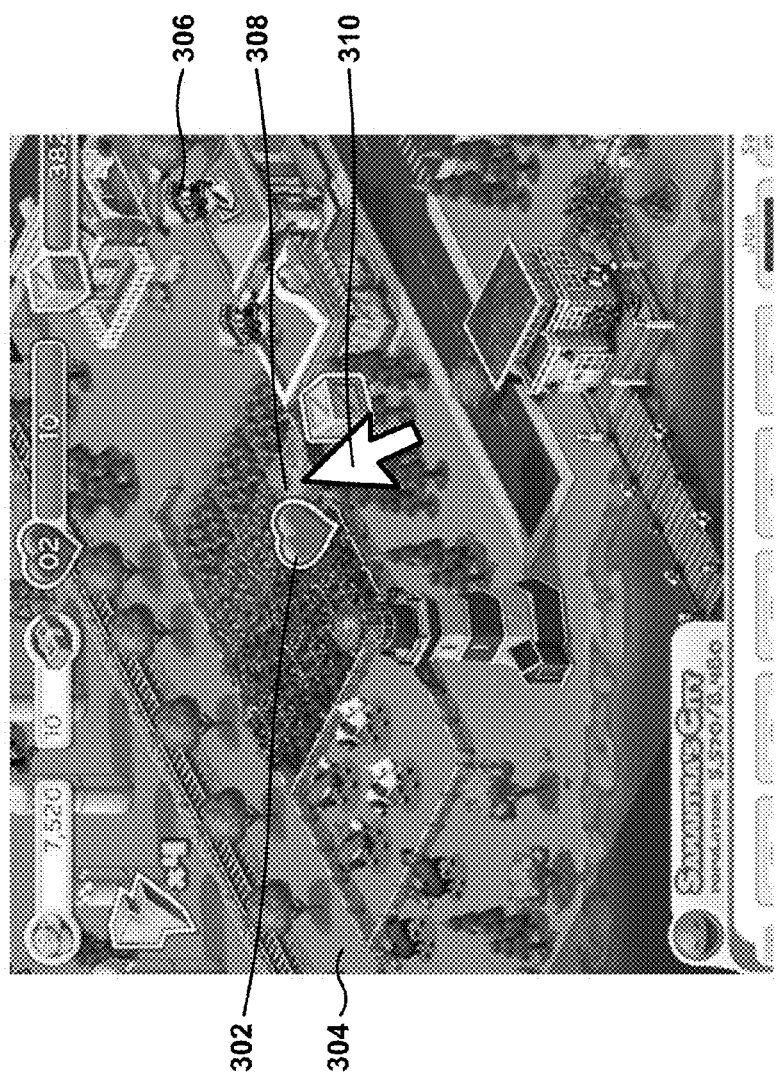
FIG. 3 shows a user visiting the game board of another user, according to one embodiment.

FIG. 3 shows a player visiting the game board of another player, according to one embodiment. When a player wishes to visit the game board of a neighbor, the player selects an option in the game to visit the neighbor. For example, clicking on the "visit" button next to the icon of player 214 in FIG. 2. The game loads the game board 304 of the neighbor, and the player is given certain options to interact with the game within the game board of the player. Typically, the interaction will create a benefit for the player and a benefit for the neighbor. In the embodiment of FIG. 3, the player is given the option of harvesting a crop, sending a bus tour 306, feeding an animal, etc. For example, if the player clicks 310 on crop 308, the crop is harvested and the player gets a reward 302.

It should be noted that the activities that player can perform while visiting a neighbor's game board may be similar to the activities that the friend may perform in her own game board. However, there may be some activities that the friend may perform while visiting and that the player cannot perform in her own game board, and vice versa.

Figure 4:
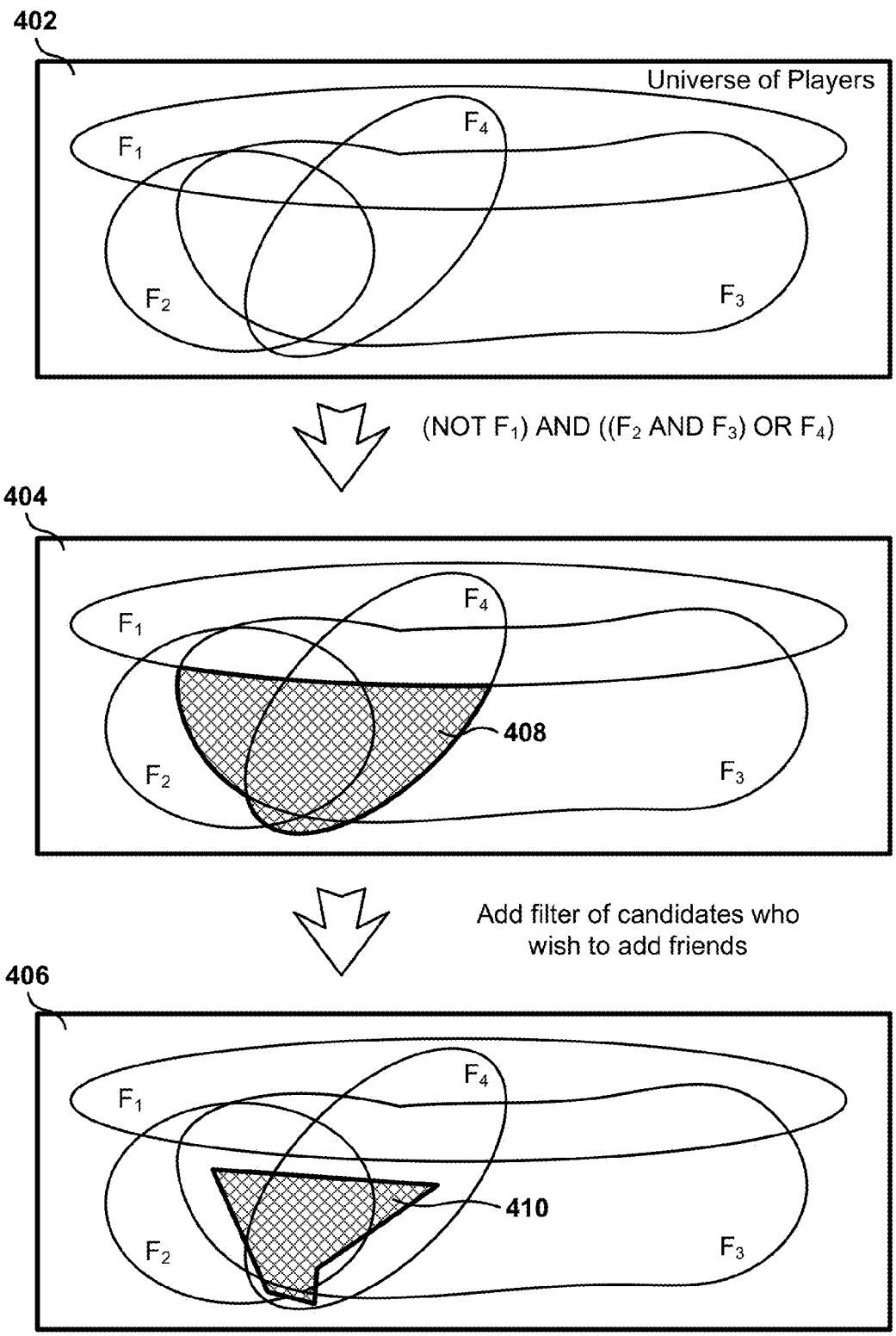
FIG. 4 illustrates a filtering method for finding candidate friends, according to one embodiment.

FIG. 4 illustrates a filtering method for finding candidate friends, according to one embodiment. Embodiments of the invention enable users to find new friends for the online game, where the new friends can be inside or outside their social network. An option is presented to a player that enables the player to find new friends for the online game. In one embodiment, the potential new friends are limited to those players that are not currently part of the player's social network, i.e., friends that are outside the social network of the player. Thus, if a first player establishes a link with a second player, which is outside the first player's social network, then the first layer and the second player will be able to play together (i.e., cooperate) in the online game, without having to establish a social link in a social network. Of course, if there is currently a social link between a player and a potential friend, but the system is not aware of this current social link, it is possible that the system recommends potential new friends that already have social links with the player.

In one embodiment, the system specifies the social networks to be considered when defining social links. The online game system interfaces with the specified social networks to obtain social data, including friendship relations. This way, the user knows that, although he may have a friend in Yahoo Groups, the online game is not accessing data from Yahoo Groups, and the online game will not consider the two friends in Yahoo Groups to be socially linked.

As described in more detail below with reference to FIGS. 5-7, a player is offered options to search for new friends that have a current social link with the player, search for new friends that do not have a current social link with the player, or search for new friends with disregard to whether there is a current social link or not.

Some examples of social networks may include, without limitation to others, Facebook, Google+, Yahoo! Groups, Linkedin, Twitter®, etc. In addition, a social link may also be defined in other types of websites, such as users that are registered, and have a login, in a particular website (e.g., a website for alumni of a university). In some social networks, it is possible for the user to follow a certain user of a social network, without the user being necessarily a "friend" of the other user. For example, a user of my "like" a soccer club that regularly posts news in a Facebook page. In one embodiment, a user is able to select another user that shares an interest. For example, a user may search for friends for the online game that like the same rock group. In one embodiment, the interest of a user is found in the user's profile in one of the social networks.

In addition, as used in herein, a social link exists between two persons, when there is a direct link between the two persons, i.e., the two persons are friends or somehow directly connected in a social network. Two persons may have a shared friend in a social network, therefore, they have an indirect social relationship, but this is not considered a social link, as used herein, unless otherwise specified. As described below with reference to FIG. 6, an option is available for the user to select friend-of-a-friend as a potential criteria for the search. However, it is noted that if a user were to select an option to search for friends outside her existing social network, friends of friends would be possible candidates for this type of search, because a direct relationship does not exist between both players.

In one embodiment, the user has an option to define which social networks to use in order to define what constitutes a social link, at least for the purpose of searching for new friends. For example, a user may specify that only Facebook friends are to be considered as friends of the searching user (i.e., they have a current social link in Facebook), in the context of the search for game friends. Therefore, if another person has a link established in another group (e.g., Linkedin), this link in the other group would not be considered a social link in that particular search. In another embodiment, the user selects which are the social networks that contain social links for this user. This way, a user may define that this user has social links in Google+ and Zynga Poker, for example. In this case, the online game will only consider social links in this two social networks when performing searches for this user.

There may be different criteria to select possible friends. For example, a player may wish to befriend a player based on gender, skill level, geographic location, playing hours, etc. Embodiments of the invention, allow the player to select the filtering criteria to find new friends. In addition, the online game may also provide additional filtering criteria, such as linking together players with similar spending patterns. Further yet, additional filters may be sent for accepting friends and requests. For example, a player may decide to accept requests only from female players.

FIG. 4 illustrates the process for filtering potential friends. The universe of players 402 includes all the players that are currently subscribed to play the online game. $F_1$-$F_4$ are filters that, when applied, produce a subset of players from the universe of players 402. Each filter is represented as a geometric figure, were players selected by the filter are situated inside the geometric figure, and players not selected by the filter are situated outside the geometric figure. Of course, a player may select one or more filters when looking for friends, and not all filters must be utilized. The filters may also be combined using any logical operation, such as Boolean AND, OR, NOT, etc. Furthermore, the filters may be assigned weights, and the results prioritized according to a score, which is based on the weights of the selected filters.

In the environment shown in FIG. 4, a player has selected four filters $F_1$-$F_4$, using a Graphical User Interface (GUI), such as the one described below with reference to FIG. 6. In addition, the player has defined a logical expression to combine the filters. The logical expression is as follows:

Candidate Friends=(NOT $F_1$) AND (($F_2$ AND $F_3$) OR $F_4$).

Below are other examples of logical expressions:

Candidate Friends=$F_1$ AND ($F_2$ OR $F_3$).
Candidate Friends=IF (F1) THEN ($F_2$ AND $F_3$) ELSE $F_4$.
Candidate Friends=((NOT $F_1$) AND $F_2$) OR ($F_1$ AND $F_4$).

Once the logical expression is applied to the universe of players 402, the result is a set of players 408 represented by the players inside the resulting geometric figure. Afterwards, the online game applies an acceptance filter defined by one or more of the players in the online game. The acceptance filter defines which players, from the universe of players, may request to become friends of the player setting the acceptance filter. In the embodiment of FIG. 4, the online game filters out those players that have indicated that they do not want to receive friend requests from players outside their social network. Once the acceptance filter is applied to the set of players 408, a subset of players 410 is obtained. One or more of the subset of players 410 may be presented to the player for sending a friendship request.

As a result, players are matched with other players that may have similar gaming interests, or similar social interests. Players are not limited to play only with friends from their social network. In one embodiment, the universe of players 402 is not limited to the players from the online game, and the universe of players 402 may also include other players engaged in other online games.

Figure 5:
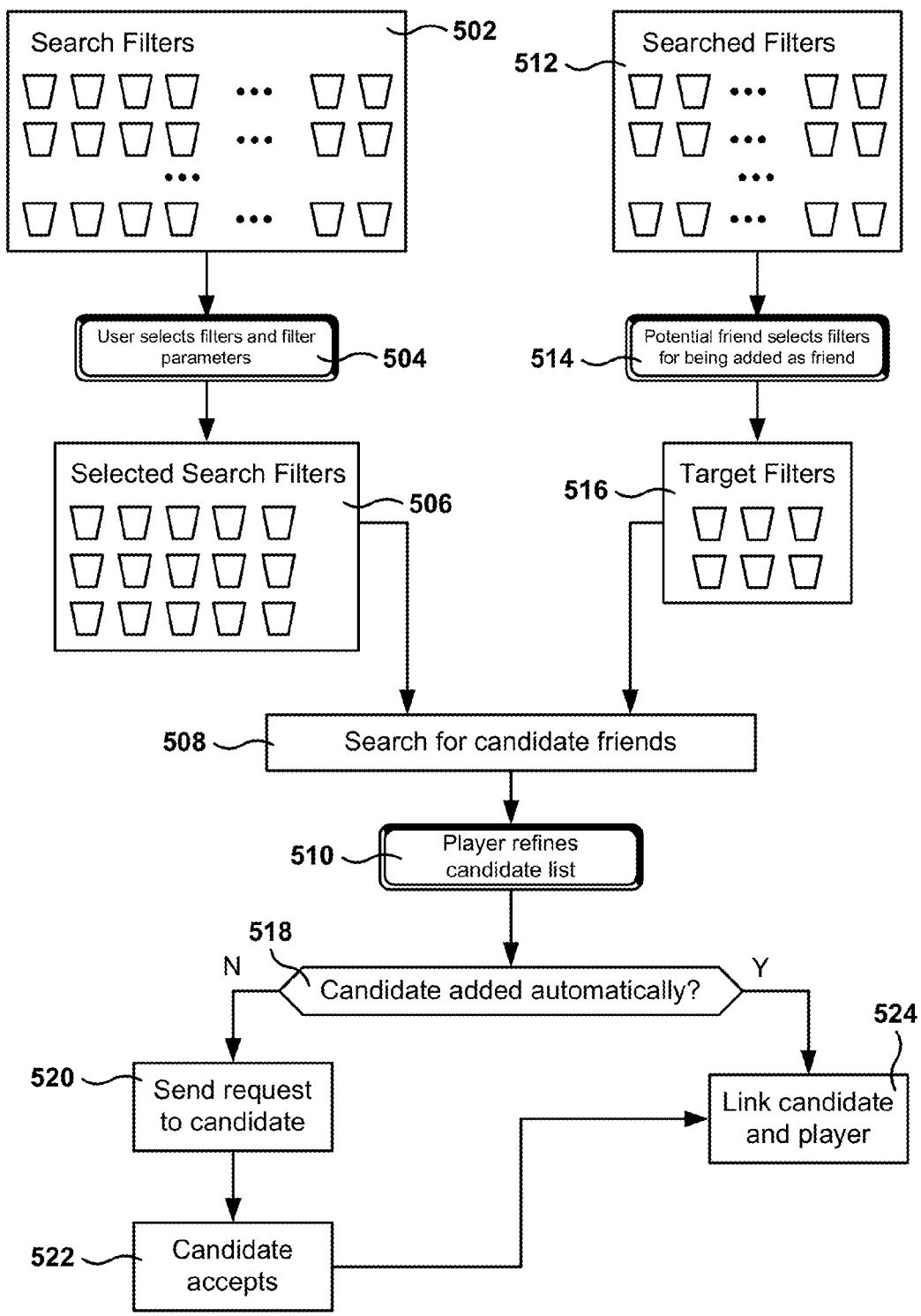
FIG. 5 illustrates the process for finding friend candidates that takes into account the filters set by players on both ends of the friendship-establishment transaction, according to one embodiment.

FIG. 5 illustrates the process for finding friend candidates that takes into account the filters set by players on both ends of the friendship-establishment transaction, according to one embodiment. A plurality of filters is provided by the online game to enable users to find friends (filters 502), or to be found by people looking for friends (filters 512). In addition, other filters (not shown) are used by the online game to fine-tune the friend searches using criteria defined by the online game. More details on the filters utilized by the online game are given below with reference to FIG. 7.

In operation 504, a user looking for friends selects one or more search filters 502 for the search, as well as parameters associated with each of the filters, if the parameters are needed or wanted for each of the filters. For example, a user may select an age filter and enter a parameter of "between 15 and 25 years old." The result of operation 504 is one or more selected filters, with the corresponding parameters for each of the filters, if entered by the user.

For description for process, it is referred to herein as a "searched friend" to a user or player that is a candidate for becoming a friend of a player searching for friends. In addition, it is referred to herein as a "searched filter" to a filter set by a "searched friend" defining which players may establish, or request to establish, a friendship relationship with the searched friend.

In operation 514, the searched friend selects from the searched filters 512 to limit the type of players that may become friends of the searched friend. The result is a set of searched filters, also referred to as target filters 516. Of course, it is possible that either the player looking for a friend, or the searched friend do not select any of the filters available, which would mean that the whole universe of players would be available to complete the friendship request.

In operation 508, the online game searches for candidate friends by taking into account the selected search filters 506 and target filters 516. The result is a list of candidate game friends. In one embodiment, the list, or a portion of the list, is presented to the player looking for friends, in order to give the player a chance to further refine the list of candidate friends, such as by selecting directly from the presented list, or by modifying the filters in order to repeat the search operation with new filters. In one embodiment, a matching score is provided for each of the candidate game friends. In another embodiment, the player is not given the chance to review the list, and the online game proceeds to add new friends or send requests to candidate new friends for becoming friends.

In operation 510, the player refines the candidate list, if so desired, and then, for each of the candidates left in the list, the online game determines 518 if the candidate is to be added automatically as a friend. If the candidate is to be added automatically as a friend, the online game establishes a social link between the player and the candidate, in operation 524. In one embodiment, the candidate is automatically added as a friend of a requesting player when the candidate has established a universal acceptance filter, that specifies that friendship requests are always accepted, without having to request permission from the searched friend.

On the other hand, if the candidate is not to be added automatically as a friend, the online game sends a request 520 to the candidate. If the candidate accepts to become a friend upon receipt of the friendship request, in operation 522, then the accepting candidate and the friend are socially linked in operation 524. In one embodiment, once the player and the candidate are linked in the online game (i.e., the player and the candidate become friends in the online game), the candidate can provide help to the player in the online game, and vice versa.

Figure 6:
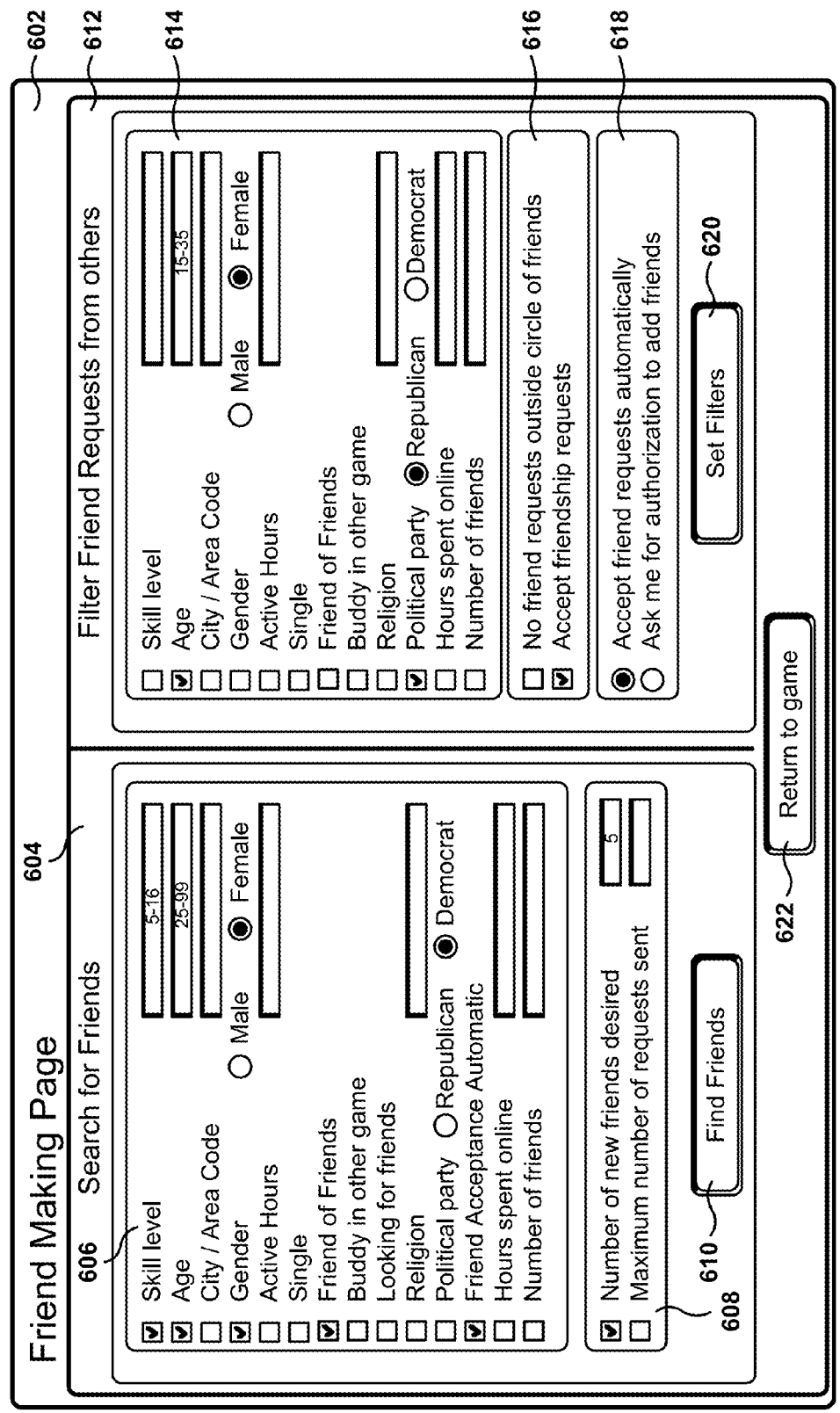
FIG. 6 shows a Graphical User Interface (GUI) for setting filters, according to one embodiment.

FIG. 6 shows a Graphical User Interface (GUI) for setting filters, according to one embodiment. FIG. 6 illustrates an embodiment of a sample GUI that includes a friend-making webpage 602. The friend-making webpage 602 includes a first search area 604 for setting filters when searching for new friends, a second area 612 with searched filters defining when players allow requests to become friends, and a button 622 for leaving webpage 602, such as by returning to the online game.

The first search area 604 for setting filters includes a plurality of filters 606 that can be optionally set when searching for friends. The filters limit the candidates that can become friends of the player. Each filter includes a checkbox that enables the user to select the particular filter. Some filters (e.g. skill level) include a field for a entering a value associated with the filter. For example, the field associated with the skill level filter can be filled with the desired skill level or skill-level range. In one embodiment, the skill level can be defined as 5, >5, <25, 5-99 (5 to 99), etc. Some filters include radio buttons that enable the user to select one from a plurality of options. For example, the gender filter can be set as male or female. Of course, if both genders are desired, then the player would not select the checkbox associated with the gender filter.

The embodiment presented in FIG. 6 includes the following filters for the searched friend:
 Skill level—defines the skill level in the online game achieved by the searched friend;
 Age—defines the age or age range;
 City/Area Code—defines the geographic location;

Active Hours—defines the time of the day were the searched friend is more likely to be found playing the online game;
 Single—defines that the searched friend has to be single;
 Friend of Friends—defines that only friends of friends can be searched friends;
 Buddy in other game—defines that the searched friend must already be a friend in another online game;
 Looking for friends—defines that the searched friend has indicated a desire to add new friends;
 Religion—defines the religion;
 Political party—defines the political affiliation;
 Friend Acceptance Automatic—defines that only players that want to become friend's automatically are to be identified (i.e., a request for friendship is not required to become friends);
 Hours spent online—defines the amount of time that the searched friend spends on average playing the online game; and
 Number of friends—defines how many current friends the searched friend has (e.g., 20-30).

Other filters may include skill level in other games, players belonging to a same online group (e.g., are registered as users in the same website), players belonging (or not) to a specific social network or social networks (e.g., a player having a Facebook account), players having a higher game skill level, players having a lower skill level, players with a same skill level, school, neighborhood, occupation, etc.

In addition, the first search area 604 includes a selection area 608 to specify the number of friends desired, and the maximum number of requests sent for friendship. For example, a user may be searching for 3 friends and does not want the system to add more than 3 friends. Since some friendship requests may not be accepted, the user may wish to set the number of requests that are sent out (e.g., 10 requests). In one embodiment, once the number of new friends desired has been reach, the outstanding requests are canceled. When the user selects button 610 "find friends," the system proceeds to generate the list of candidate friends, as described above. In one embodiment, the player is given the option (not shown) to weight the different filters, and to prioritize the filters.

The second area 612 includes a filter selection area 614, an acceptance selection area 616, an automatic acceptance setting area 618, and an option button for setting the filters 620. The filter selection area 614 includes a list of filters defining the criteria for accepting friendship requests. These filters are similar, or the same, as the filters described above in area 606 with reference to filters for searching friends, except that they work in the opposite direction.

The acceptance selection area 616 allows the user to specify that no friendship requests are to be accepted outside the current circle of friends, as specified in one or more social networks, and an option to accept, or not, friendship requests from strangers. The automatic acceptance setting area 618 allows the player to specify that requests are to be accepted automatically (i.e., without requiring an express acceptance), or to specify that previous authorization is required.

It is noted that the embodiment illustrated in FIG. 6 is exemplary. Other embodiments may utilize different filters, present the filters in a different way, allow the introduction of logical expressions to link the filters, weights, etc. The embodiment illustrated in FIG. 6 should therefore not be interpreted to be exclusive or limiting, but rather exemplary or illustrative.

In one embodiment, the online game provides default values for the filters. For example, the online game may set, by default, searching for players of a different gender than the searching player, and that all players will accept friendship requests outside their social network. The default settings may be changed by the players.

In yet another embodiment, the online game does not present the filters to the player. When the player is looking for a friend, the player selects an option asking the online game to find friends. The online game uses its own internal filters to determine which players to recommend or to link with the player looking for friends. For example, if the player is at level 62, the online game may recommend somebody at level 64, because a player at level 64 can help the player with the lower skill level to advance in the game. In this case, the player sees the result of the filtering done by the online game, and not the filters themselves.

Figure 7:
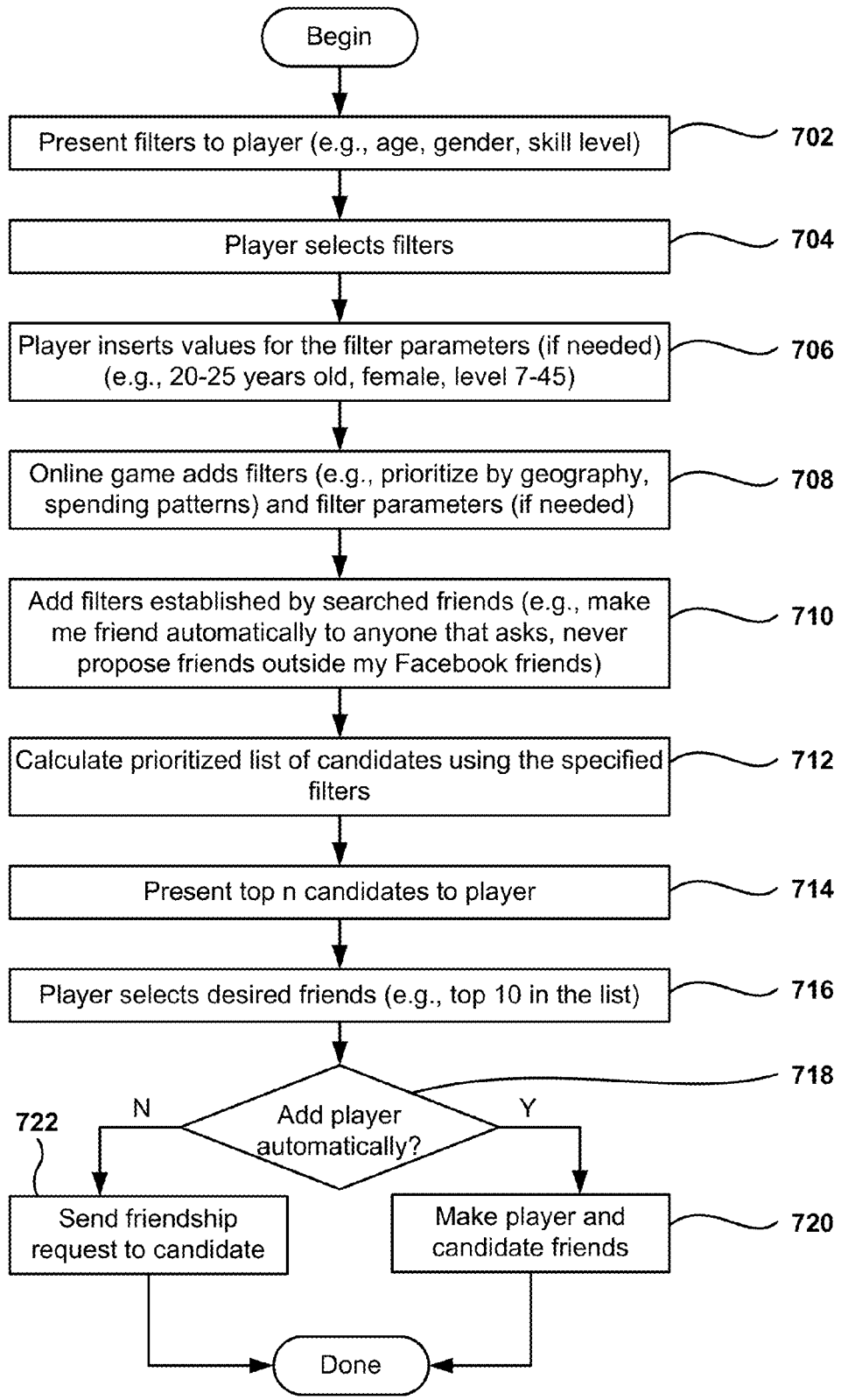
FIG. 7 shows a flowchart for expanding a player's social network utilizing a plurality of filters, according to one embodiment.

FIG. 7 shows a flowchart for expanding a player's social network utilizing a plurality of filters, according to one embodiment. In operation 702, the online game presents a plurality of filters to the player (e.g., age, gender, skill level). See for example the GUI presented in FIG. 6, although other GUIs for presenting the filters are possible, such as GUIs that allow the player to select filters, assign weights to the filters, prioritize the filters, etc. In operation 704, the player selects which filters to be used in the search for friends, and in operation 706, the player inserts values associated with the selected filters (e.g., age range from 20 to 25), if needed.

In one embodiment, the online game adds filters (i.e., players in the same city) in operation 708, and filter parameters, if needed. Additionally, in operation 710, the online game adds the filters established by the searched friends. For example, some players may wish to become friends of anyone who asks, while other players may not wish to receive invitations from players outside their social network.

In operation 712, the online game calculates prioritized list of candidates using the filters described above. In one embodiment, a matching score is assigned to the candidates, and the list is prioritized according to the respective matching scores. In operation 714, the candidates are presented to the player. In one embodiment, the number of candidates presented is limited to a predetermined maximum number, since the list of candidates could be in the thousands. For example, the online game may present 10, 20, or maybe even 100 candidates, although other numbers are also possible. In one embodiment, a profile picture and/or profile information is presented for each of the candidates.

In one embodiment, the candidates are not presented to the player, as indicated in operation 714, and the game automatically sends a request to become friends to a predetermined number of candidate game friends with the highest matching score.

In operation 716, the player selects one or more players from the list of candidates (e.g., the top 10 in the list, or the ones that look more interesting from their profile picture). Once the desired players are selected, the online game checks, in operation 718, if each of the selected players are to be added as friends automatically (i.e., without requiring acceptance by the searched friend), or if acceptance by the searched friend is required.

Further, if a player is to be added automatically, the method continues to operation 710, and the player and the candidate are linked in the online game, that is, the player and the candidate become friends in the online game. If the candidate is not to be added automatically, the method continues to operation 722 and a request to become friends is sent to the candidate. If the candidate accepts the request (not shown) the online game will link both players in the online game.

Figure 8:
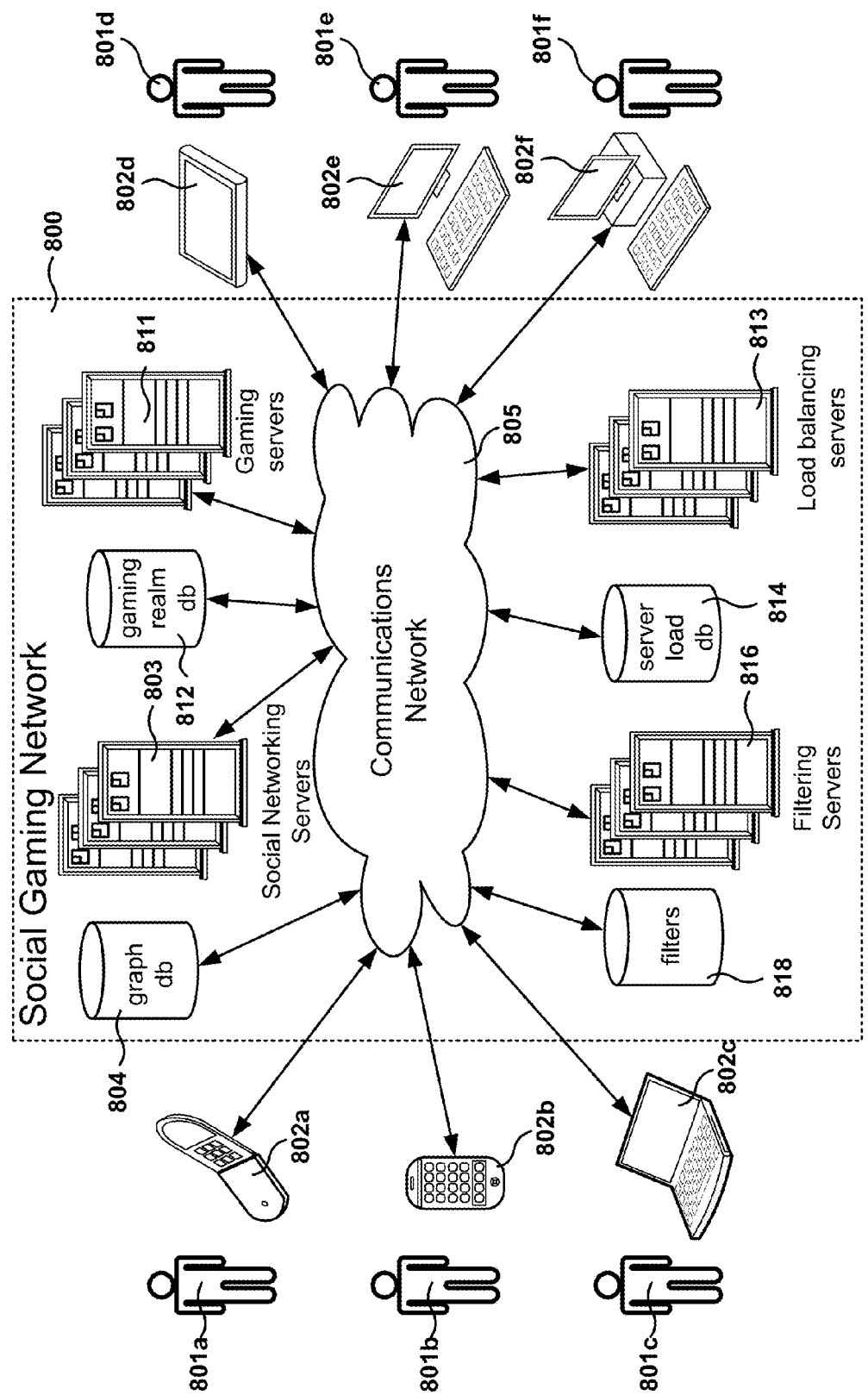
FIG. 8 shows a block diagram illustrating a social gaming network architecture, according to one embodiment.

FIG. 8 shows a block diagram illustrating a social gaming network architecture, according to one embodiment. In some implementations, a plurality of players (e.g., 801*a*-801*f*) may be utilizing a social gaming network 800. Each player interacts with the social gaming network via one or more client devices (e.g., client devices 802*a*-802*f*). The clients may communicate with each other and with other entities affiliated with the gaming platform via communications network 805. Further, the players may be utilizing a social networking service provided by a social networking server (e.g., social networking servers 803) to interact with each other.

When a player provides an input into the player's client device, the client device may in response send a message via the communications network to the social networking server. The social networking server may update the player profile, save the message to a database, send messages to other players, etc. The social gaming network may include a social graph database 808, which stores player relationships, social player profiles, player messages, and player social data.

The gaming servers 811 host one or more gaming applications, and perform the computations necessary to provide the gaming features to the players and clients. One or more gaming realm databases 812 store data related to the gaming services, such as the gaming applications and modules, virtual gaming environment ("realm") data, player gaming session data, player scores, player virtual gaming profiles, game stage levels, etc. The gaming servers may utilize the data from the gaming realm databases to perform the computations related to providing gaming services for the players. In some implementations, a server load database 814 stores gaming server load statistics, such as computational load, server responses times, etc.

The social gaming network may include one or more load balancing servers 813, and one or more filtering servers 816. The filtering servers 816 assist players in obtaining new friends, by providing a plurality of filters, that are configurable by players looking for players, and configurable by the players themselves to provide rules regarding which players can send requests to become friends. In one embodiment, a filter database 818 stores filter related information, such as available filters for searching, available filters for accepting requests, filters added by the online game, search history, past friendship requests, pending friendship requests, etc.

Figure 9:
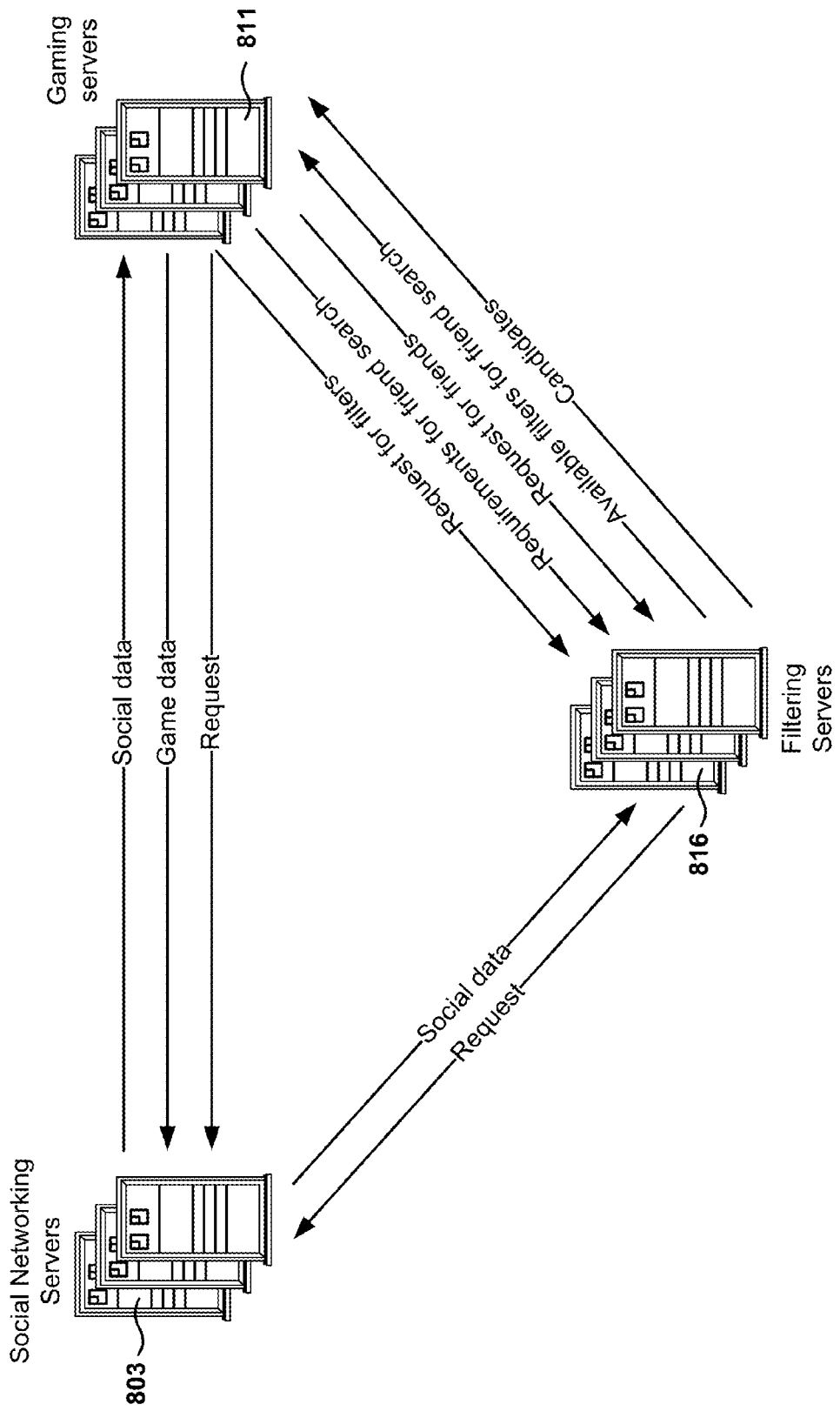
FIG. 9 illustrates the interactions between the servers of FIG. 8, in accordance with one embodiment of the invention.

FIG. 9 illustrates the interactions between the servers of FIG. 8, in accordance with one embodiment of the invention. As described above, social networking servers 803 collect social data regarding the players. This social data is made available to gaming servers 811 and filtering servers 816. The social data may be sent periodically, without a request for data, or may be sent as the result of a request sent from the gaming servers 811 or the filtering servers 816.

The gaming servers 811 are used to execute the online games and hold the gaming data, which can be shared with social networking servers 803 and filtering servers 816. When a player in the online game is searching for friends, gaming servers 811 sends a request to filtering servers 816 for the filters available for searching friends. In response, filtering servers 816 sends the available filters to gaming servers 811.

Gaming servers 811 then presents the filters to the player, such as, for example, by using the GUI described with reference to FIG. 6. After the player makes her selection, gaming servers 811 sends the requirements for the friend search to filtering servers 816. The filtering servers 816 then perform the search for candidate friends according to the filters received. Filtering servers 816 utilize the social data received from social networking servers 803 for the search, and data regarding friendship relations within the online game received from gaming servers 811. Afterwards, the results of the search, which include the candidates, are sent to gaming servers 811.

It is noted that the embodiments illustrated in FIG. 9 are exemplary. Other embodiments may utilize different server configurations, divide the tasks differently among the servers, or exchange information between servers in different forms. The embodiments illustrated in FIG. 9 should therefore not be interpreted to be exclusive or limiting, but rather exemplary or illustrative.

Figure 10:
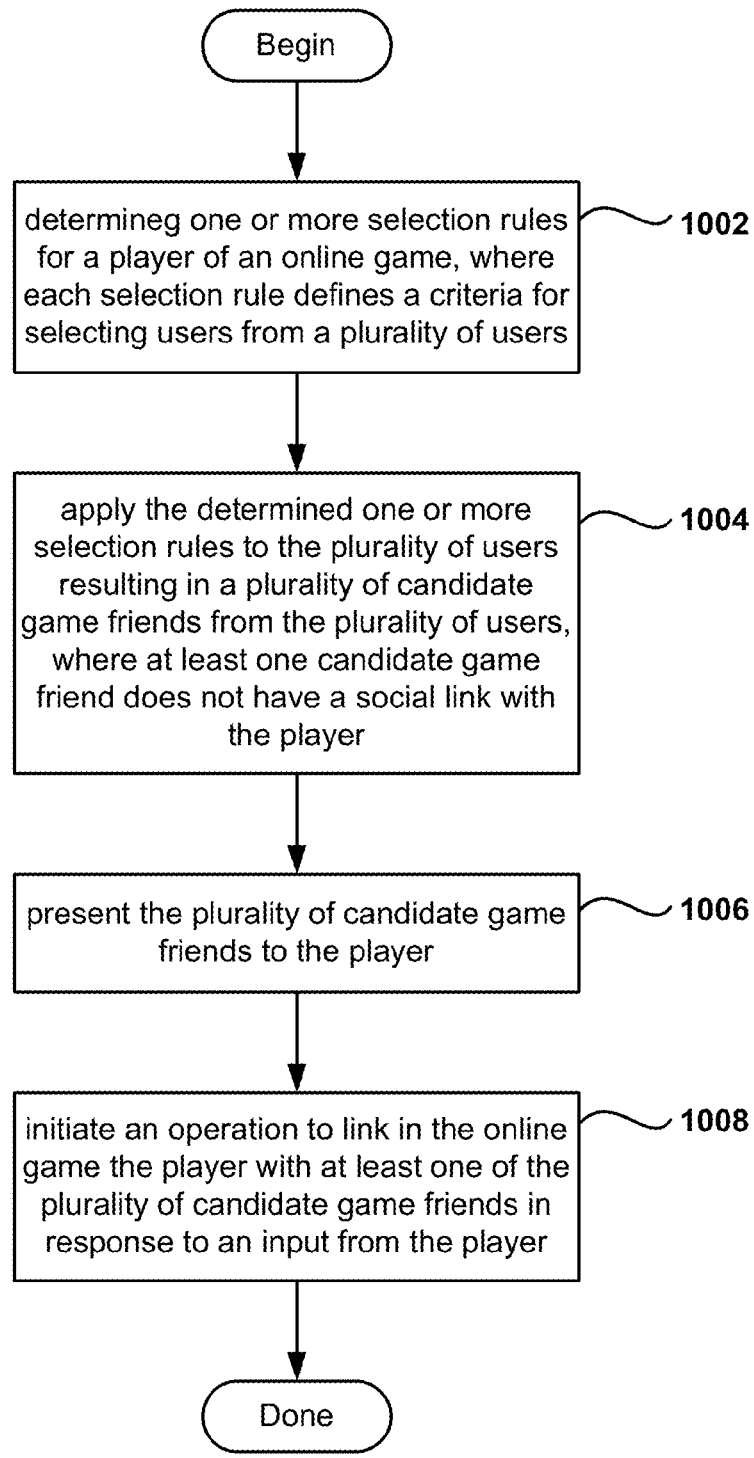
FIG. 10 shows a flowchart illustrating an algorithm for expanding a player's gaming social network, in accordance with one embodiment of the invention.

FIG. 10 shows a flowchart illustrating an algorithm for expanding a player's gaming social network, in accordance with one embodiment of the invention. In operation 1002, one or more selection rules are determined for a player of an online game, each selection rule defining a criterion for selecting users from a plurality of users. From operation 1002, the method continues to operation 1004, where the determined one or more selection rules are applied to the plurality of users, which results in a plurality of candidate game friends from the plurality of users. It is noted, that at least one candidate game friend does not have a social link with the player.

From operation 1004, the method continues to operation 1006, where the plurality of candidate game friends is presented to the player. An operation to link, in the online game, the player with at least one of the plurality of candidate game friends is initiated, in operation 1008, in response to an input from the player. At least one operation of the method of FIG. 10 is executed through a processor.

Figure 11:
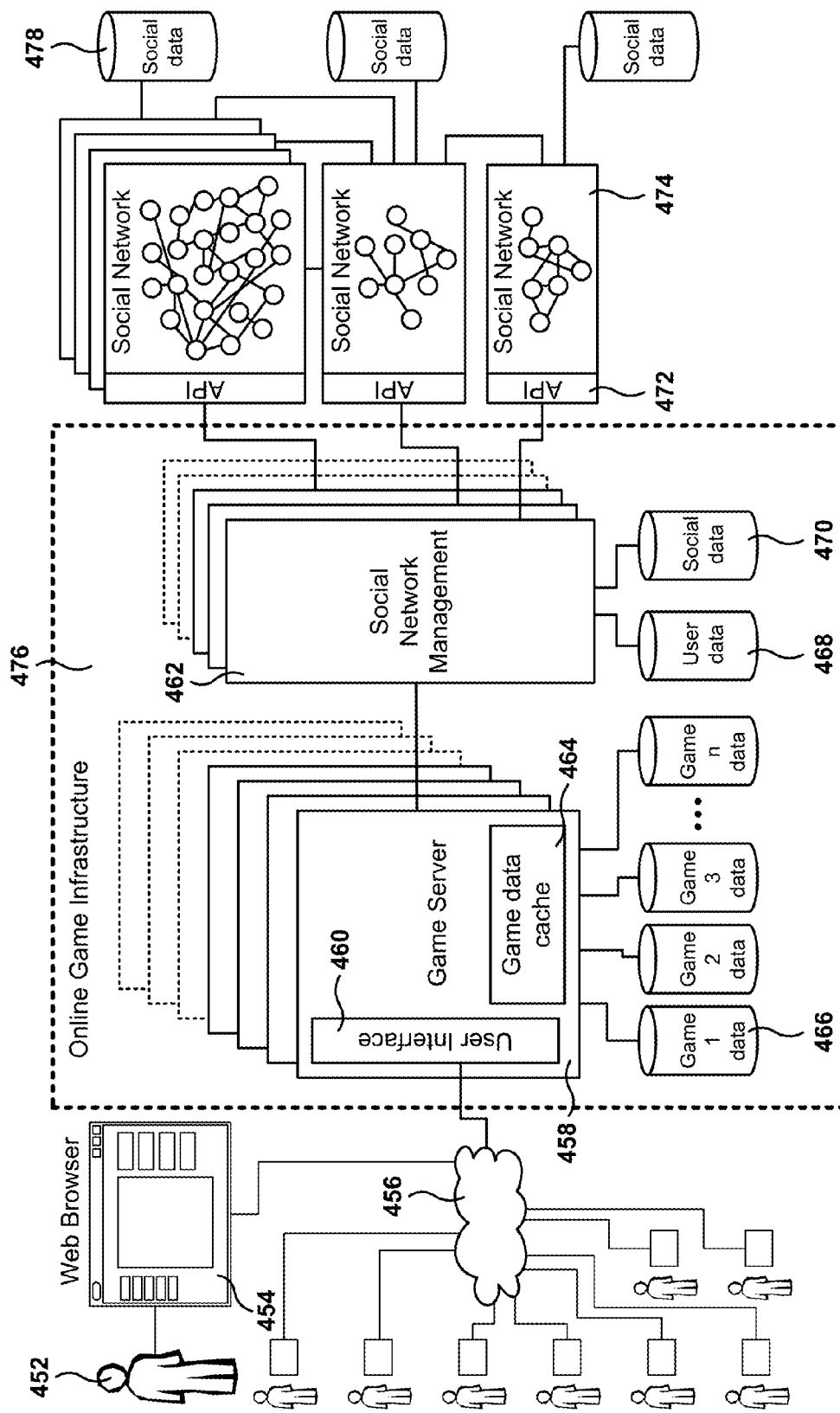
FIG. 11 illustrates an implementation of a Massively Multiplayer Online (MMO) infrastructure, according to one embodiment.

FIG. 11 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also includes one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 11 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 11 should therefore not be interpreted to be exclusive or limiting, but rather exemplary or illustrative.

Figure 12:
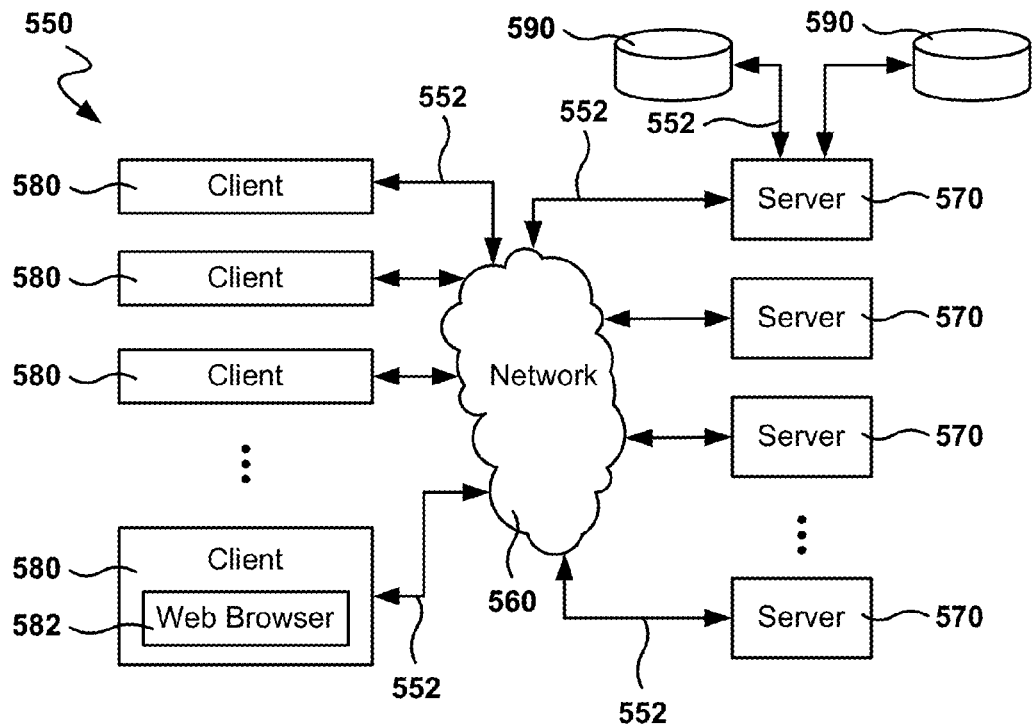
FIG. 12 illustrates an example network environment suitable for implementing embodiments of the invention.

FIG. 12 illustrates an example network environment 550 suitable for implementing embodiments of the invention. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wireline, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HTML files or other file types, or may dynamically create or constitute files upon a request, and communicate them to clients 580 in response to HTTP or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a netbook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as MICROSOFT INTERNET EXPLORER, GOOGLE CHROME, or MOZILLA FIREFOX, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 13:
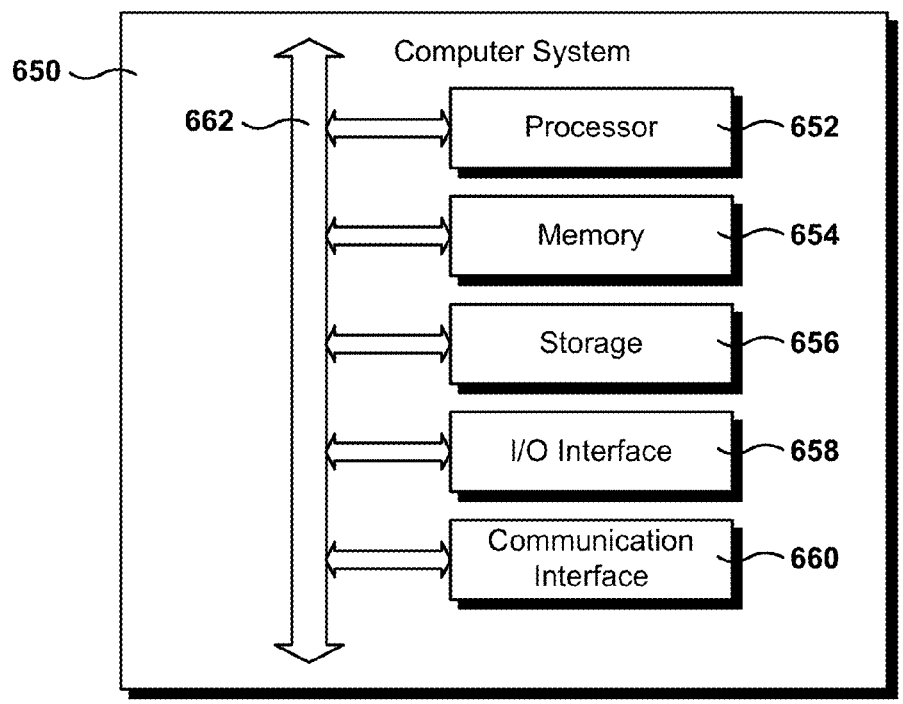
FIG. 13 illustrates an example computer system for implementing embodiments of the invention.

FIG. 13 illustrates an example computer system 650 for implementing embodiments of the invention. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments of the invention may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include an HDD, a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments of the present invention can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for processing game operations during execution of an online game, the method comprising:
    sending, by a game server, a request for filters to a filtering server, wherein the filtering server is configured to access a filters database that includes filters for desired new friends, filters for accepting friendship requests, or filters for limiting friendship searches by the online game;
    sending, by the filtering server, one or more of the filters for desired new friends to the game server;
    receiving, by the game server, a selection of first filters from the filters for desired new friends, the first filters being selected by a first user in the online game, the first filters identifying first criteria for desired new friends in the online game;
    sending, by the game server, the first filters to the filtering server;
    identifying, by the filtering server, second filters from the filters for accepting friendship requests, the second filters being selected by a plurality of users in the online game, the second filters being entered by each user in a graphic user interface (GUI) to identify second criteria for being added as a new friend by other users in the online game;
    determining, by the filtering server, a plurality of candidates for becoming new friends of the first user, wherein the candidates are not currently friends of the first user in the online game, wherein each candidate from the plurality of candidates conforms to the first criteria and wherein the first user conforms to the second criteria set by each candidate from the plurality of candidates, wherein determining, by the filtering server, the plurality of candidates further includes accessing a social server to obtain social data of the first user, wherein the social server provides the social data from a social network outside the online game, wherein the obtained social data includes friendship relationships for the first user in the social network;
    sending the determined plurality of candidates from the filtering server to the game server;
    sending, by the game server, friendship requests to one or more of the candidates when the second filters require candidate confirmation; and
    adding one or more candidates as new friends of the first user without sending a friendship request when the second filters enable adding friends without candidate confirmation, wherein operations of the method are executed by a processor.

2. The method as recited in claim 1 further including:
    presenting, in the online game, one or more of the determined candidates to the first user; and
    providing a user interface in the online game to refine the presented candidates.

3. The method as recited in claim 1 further including:
    adding third filters, from the filters for limiting friendship searches, selected by the online game, the third filters identifying third criteria for proposing new friends to the first user; and eliminating from the plurality of candidates those candidates that do not conform to the third criteria defined by the online game in the third filters.

4. The method as recited in claim 1 further including:
receiving a selection of a first candidate before the sending of friendship requests.

5. The method as recited in claim 4, wherein sending friendship requests further includes:
adding the first candidate as a friend of the first user without sending the friendship request when the second filters for the first candidate allow adding a friend without requiring express permission, or sending a friendship request to the first candidate when the second filters for the first candidate require express permission for adding a friend.

6. The method as recited in claim 1, wherein the filters for accepting friendship requests include one or more of skill level, age, geography, gender, active hours online, marriage status, friend of friends, looking for friends, friend acceptance automatic, hours spent online, or number of friends.

7. The method as recited in claim 1, wherein the filters for accepting friendship requests include one or more of skill level, age, geography, gender, active hours online, marriage status, friend of friends, hours spent online, or number of friends, or automatically accept friendship requests.

8. A computer program embedded in a non-transitory computer-readable storage medium, when executed by one or more processors, for processing game operations during execution an online game, the computer program comprising:
program instructions for sending, by a game server, a request for filters to a filtering server, wherein the filtering server is configured to access a filters database that includes filters for desired new friends, filters for accepting friendship requests, or filters for limiting friendship searches by the online game;
program instructions for sending, by the filtering server, one or more of the filters for desired new friends to the game server;
program instructions for receiving, by the game server, a selection of first filters from the filters for desired new friends, the first filters being selected by a first user in the online game, the first filters identifying first criteria for desired new friends in the online game;
program instructions for sending, by the game server, the first filters to the filtering server;
program instructions for identifying, by the filtering server, second filters from the filters for accepting friendship requests, the second filters being selected by a plurality of users in the online game, the second filters being entered by each user to identify second criteria for being added as a new friend by other users in the online game;
program instructions for determining, by the filtering server, a plurality of candidates for becoming new friends of the first user, wherein the candidates are not currently friends of the first user in the online game, wherein each candidate from the plurality of candidates conforms to the first criteria and wherein the first user conforms to the second criteria set by each candidate from the plurality of candidates, wherein determining, by the filtering server, the plurality of candidates further includes accessing a social server to obtain social data of the first user, wherein the social server provides the social data from a social network outside the online game, wherein the obtained social data includes friendship relationships for the first user in the social network;
program instructions for sending the determined plurality of candidates from the filtering server to the game server;
program instructions for sending, by the game server, friendship requests to one or more of the candidates when the second filters require candidate confirmation; and
program instructions for adding one or more candidates as new friends of the first user without sending a friendship request when the second filters enable adding friends without candidate confirmation.

9. The computer program as recited in claim 8 further including:
program instructions for presenting one or more of the determined candidates to the first user; and
program instructions for providing a user interface to refine the presented candidates utilizing additional filtering criteria.

10. The computer program as recited in claim 8 further including:
program instructions for adding third filters, from the filters for limiting friendship searches, selected by the online game, the third filters identifying third criteria for proposing new friends to the first user; and
program instructions for eliminating from the plurality of candidates those candidates that do not conform to the third criteria defined by the online game in the third filters.

11. The computer program as recited in claim 8 further including:
program instructions for receiving a selection of a first candidate before the sending of friendship requests.

12. The computer program as recited in claim 11, wherein sending friendship requests further includes:
adding the first candidate as a friend of the first user without sending the friendship request when the second filters for the first candidate allow adding a friend without requiring express permission, or sending a friendship request to the first candidate when the second filters for the first candidate require express permission for adding a friend.

13. The computer program as recited in claim 8, wherein the filters for accepting friendship requests include one or more of skill level, age, geography, gender, active hours online, marriage status, friend of friends, looking for friends, friend acceptance automatic, hours spent online, or number of friends.

14. The computer program as recited in claim 8, wherein the filters for accepting friendship requests include one or more of skill level, age, geography, gender, active hours online, marriage status, friend of friends, hours spent online, or number of friends, or automatically accept friendship requests.

15. The computer program as recited in claim 8 further including:
providing a graphical user interface for entering first filters and second filters.

16. A method for processing game operations during execution an online game, the method comprising:
presenting, by a game server, in the online game first filters to a first user, the first filters identifying criteria for desired new friends in a network, the online game being provided by a game server;
receiving first filter values selected by the first user;
sending, by the game server, the first filters to a filtering server;

identifying, by the filtering server, second filters selected by a plurality of users in the online game, the second filters being entered by each user in a graphic user interface (GUI) to identify criteria for being added as a new friend by other users in the network;

identifying, by the filtering server, third filters selected by the online game;

determining, by the filtering server, a plurality of candidates for new friends for the first user based on the first filter values, the second filters, and the third filters, wherein determining, by the filtering server, the plurality of candidates further includes accessing a social server to obtain social data of the first user, wherein the social server provides the social data from a social network outside the online game, wherein the obtained social data includes friendship relationships for the first user in the social;

sending the candidates from the filtering server to the game server;

presenting, in the GUI, top candidates from the plurality of candidates;

receiving a selection by the first user of desired friends from the top candidates;

sending, by the game server, a friendship request to a first candidate when the first candidate requires authorization to add a friend; and linking, by the game server, the first user and the first candidate when the first candidate accepts friends without requiring authorization, wherein operations of the method are executed by a processor.

17. The method as recited in claim 16, wherein the first filters include one or more of skill level, age, geography, gender, active hours online, marriage status, friend of friends, looking for friends, friend acceptance automatic, hours spent online, or number of friends.

\* \* \* \* \*